No. 695,163. Patented Mar. 11, 1902.
R. LUNDELL.
FIELD MAGNET FOR DYNAMO ELECTRIC MACHINES OR ELECTRIC MOTORS.
(Application filed Dec. 18, 1901.)
(No Model.) 2 Sheets—Sheet 1.
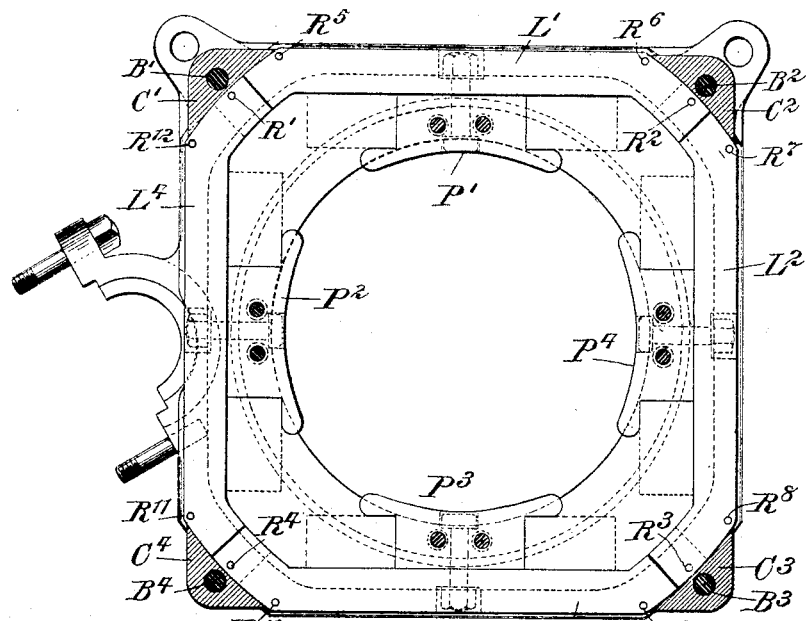
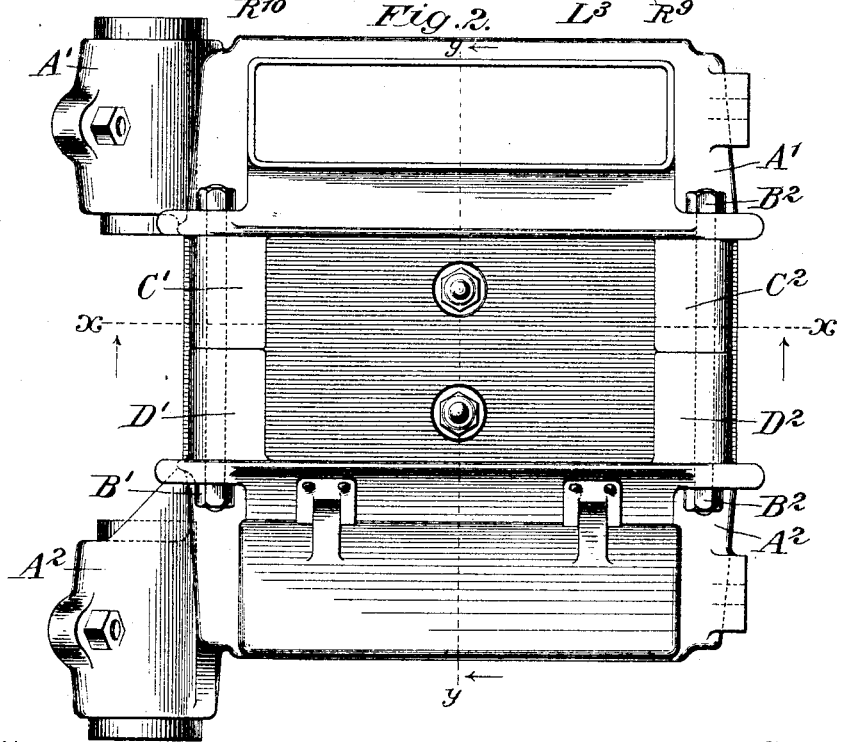
Witnesses
Edward Bjorlund
Gustaf Lang
Inventor:
Robert Lundell No. 695,163. Patented Mar. 11, 1902.
R. LUNDELL.
FIELD MAGNET FOR DYNAMO ELECTRIC MACHINES OR ELECTRIC MOTORS.
(Application filed Dec. 18, 1901.)
(No Model.) 2 Sheets—Sheet 2.

Witnesses
Edward Boyland
Gustaf Lang

Inventor:
Robert Lundell

UNITED STATES PATENT OFFICE.

ROBERT LUNDELL, OF NEW YORK, N. Y.

FIELD-MAGNET FOR DYNAMO-ELECTRIC MACHINES OR ELECTRIC MOTORS.

SPECIFICATION forming part of Letters Patent No. 695,163, dated March 11, 1902.

Application filed December 18, 1901. Serial No. 86,396. (No model.)

*To all whom it may concern:*

Be it known that I, ROBERT LUNDELL, a citizen of the United States, residing at New York, borough of Manhattan, county and State of New York, have invented certain new and useful Improvements in Field-Magnets for Dynamo-Electric Machines or Electric Motors, of which the following is a specification.

The said improvements pertain to a class of field-magnets known as "laminated field-magnets," and they are applicable to various classes of dynamo-electric machines, but particularly to motors used for railway-service.

The chief object of my invention is to provide efficient means for supporting a body of segmental laminated iron forming the outer magnetic circuit of a dynamo-electric machine or motor in an absolutely rigid manner without increasing the dimensions which limit the height and width of the apparatus.

It is well known in the art that laminated field-magnets are superior to solid field-magnets in many respects. For instance, they insure uniform cross-sections in the various magnetic circuits and great uniformity in a line of duplicate machines, which is of utmost importance when several machines are arranged to run in parallel. They also make quick changes in the magnetic flux possible.

I am aware that it is old in the art to support a laminated field-magnet by solid castings surrounding the same; but I know of no construction which could successfully be applied to street-car or railway motors, which must be crowded into the small space available on modern trucks.

To fully describe my invention, I will refer to the accompanying two sheets of drawings, in which—

Figure 3:
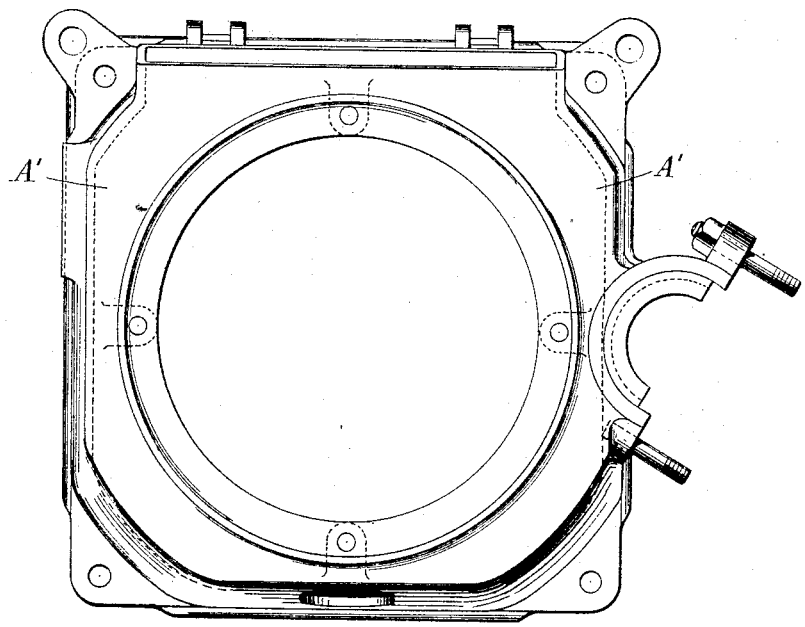
Figure 4:
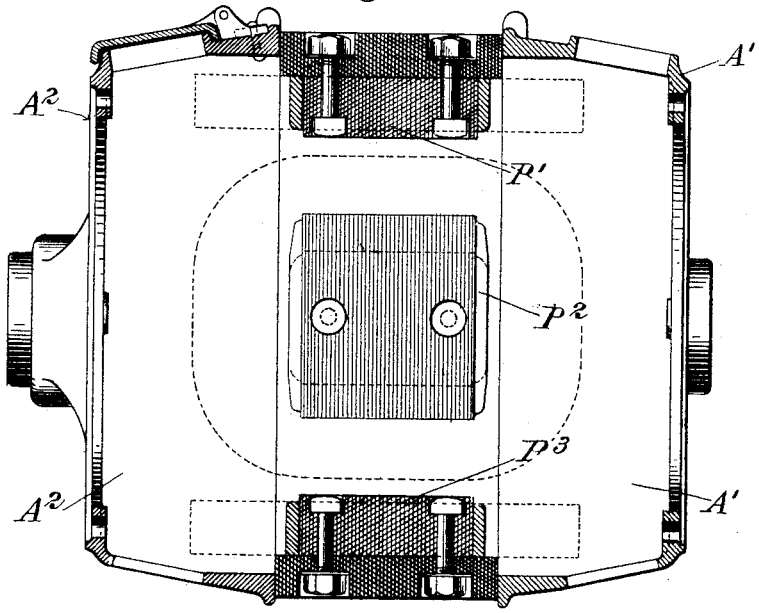

Figure 1 is a vertical section, taken at line $x$ $x$ of Fig. 2, of the laminated field-magnet with its supporting-frame; and Fig. 2 is a plan view of the same. Fig. 3 is an end view of one of the supporting-brackets; and Fig. 4 is a section of the completed field-magnet, taken at line $y$ $y$ of Fig. 2.

Referring now to the drawings in detail and particularly to Fig. 1, $L'$, $L^2$, $L^3$, and $L^4$ represent four sheet-iron punchings, each a duplicate of the other. They are of such form that when turned around for every alternate layer they will overlap or "dovetail" at the four corners, as clearly indicated on the drawings by the dotted lines. The small steel rods $R'$, $R^2$, $R^3$, and $R^4$, which pass through punched holes in the overlapping sections, serve to lock the four sections together, and the other rods $R^5$ $R^6$ $R^7$, &c., to $R^{12}$ will keep the surface of the laminations absolutely smooth as the punchings are assembled, so that the poles may be bolted onto the completed yoke without extra finish. The laminations are assembled in one of the brackets $A'$ or $A^2$. (See Fig. 2.) Each of said brackets has four strong arms or projections, constituting connecting-pieces, of which $C'$, $C^2$, $C^3$, and $C^4$ belong to bracket $A'$ and $D'$ $D^2$, &c., to bracket $A^2$. These brackets are preferably made of cast-steel. Heavy bolts $B'$, $B^2$, $B^3$, and $B^4$ (see Figs. 1 and 2) pass through said arms, locking one bracket to the other, thus completing a "skeleton" frame, which is preferably rigid with or without the laminated body portion. Both brackets are furnished with small holes (drilled from a templet) to receive the ends of the steel rods $R'$ $R^2$, &c., to $R^{12}$, which run from one bracket to the other through the entire laminated body. The laminated body can be built up, using either bracket as a foundation. The twelve steel rods or pins are inserted in their respective holes, and the laminations are threaded on the pins in the usual manner. The four corner-arms of the bracket will serve to center the laminations. A sufficient number of punchings are assembled on the pins to insure a perfectly tight body when the other bracket is bolted down against the first one.

It will be seen on inspection of Figs. 1 and 2 that the four arms or connecting-pieces $C'$ $C^2$, &c., $D'$ $D^2$, &c., are so located relatively to the laminated body portions $L'$, $L^2$, $L^3$, and $L^4$ that they do not increase the height or width—that is to say, the exterior limiting dimensions—but allow the laminations to protrude or project between said arms to the extreme outer faces of the machine.

Fig. 3 shows one of the box-shaped brackets in detail. The large opening in the same centers a bracket containing one of the armature-bearings. (Not shown on the drawings.)

Fig. 4 serves to explain the previous views and shows in particular the relative thickness of metal in the box-shaped brackets as compared to the magnetic circuits. This view illustrates also the manner in which the laminated poles P', P², P³, and P⁴ are secured to the laminated yoke.

My invention contemplates, broadly, the construction of a dynamo-electric machine or electric motor having a laminated field-magnet in which the laminations are held together *en masse* by end brackets or supports and bolts, arms or projections being combined therewith and located at the corners of the brackets or supports for rendering the structure rigid, the entire arrangement being such that the laminations extend outward between the outer or lateral edges of the brackets or supports, the united edges of the massed laminations constituting, in effect, the outer faces of the machine, thereby avoiding the presence of any useless metal between the outer edges of the laminations and any surface beneath, beside, or over which the machine may be secured, thus materially economizing space, a motor with such a field-magnet having especial utility in connection with tram-cars and in similar places where the space is necessarily limited.

Having thus described my invention, what I claim, and desire to secure by Letters Patent of the United States, is—

1. A laminated field-magnet inclosed or centered by a rigid skeleton frame with the laminations extending outward between the supporting parts of the frame.

2. A supporting-frame for a laminated field-magnet, consisting of two end brackets with connecting-pieces between them, the frame being absolutely rigid by itself when bolted together, substantially as described.

3. A four-pole form of laminated field-magnet supported by two end brackets having connecting-pieces across the four corners, substantially as described.

4. A flattened form of laminated field-magnet supported by a rigid skeleton frame provided with means for centering and securing the laminations together *en masse* with their outer edges projecting between the supporting parts of the frame.

5. A flattened form of laminated field-magnet supported by two end brackets having connecting-pieces across the laminated body portion; in combination with bolts through said connecting-pieces, substantially as described.

In testimony whereof I have signed my name to this specification in the presence of two subscribing witnesses.

ROBERT LUNDELL.

Witnesses:
C. J. KINTNER,
M. F. KEATING.